Patented May 21, 1940

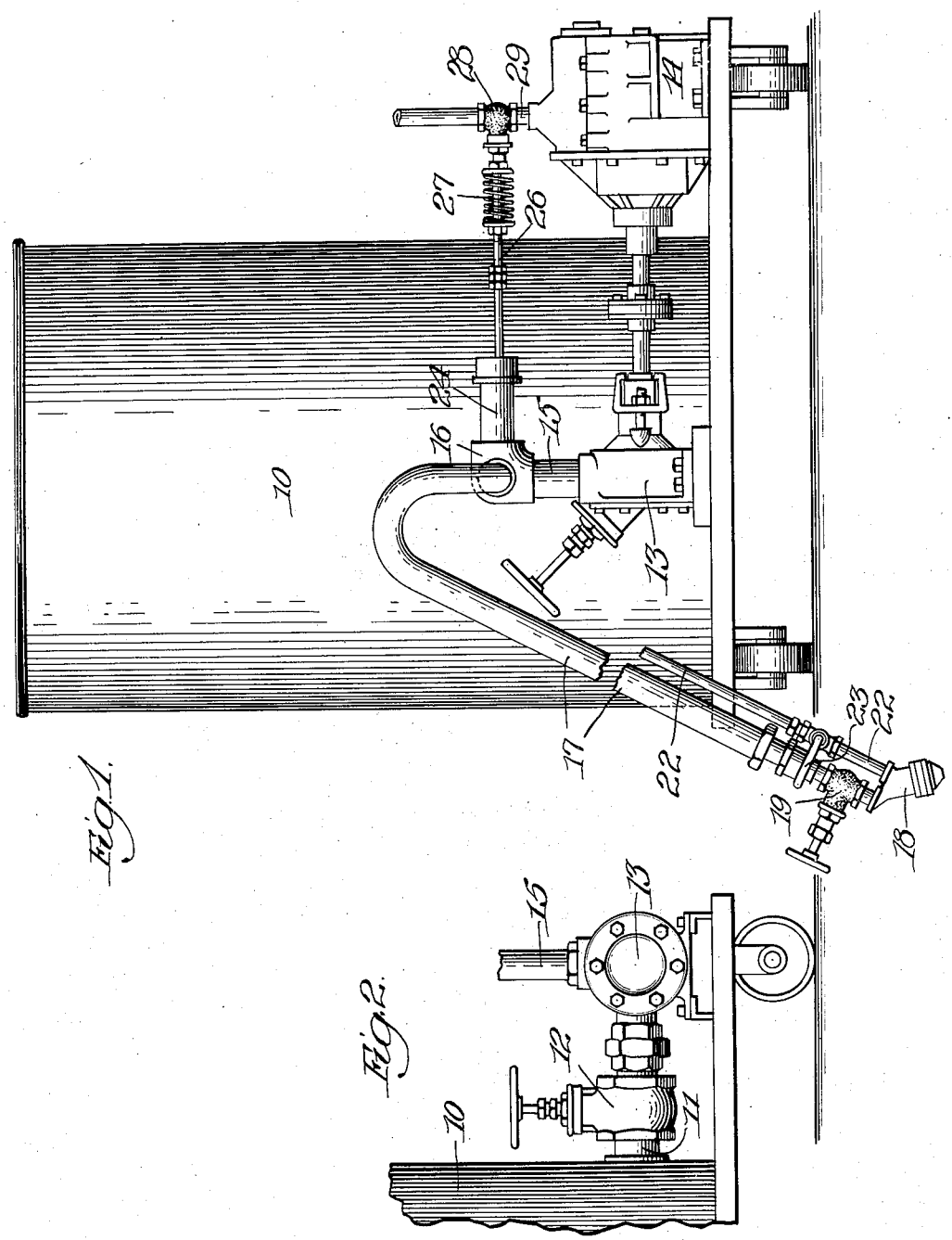

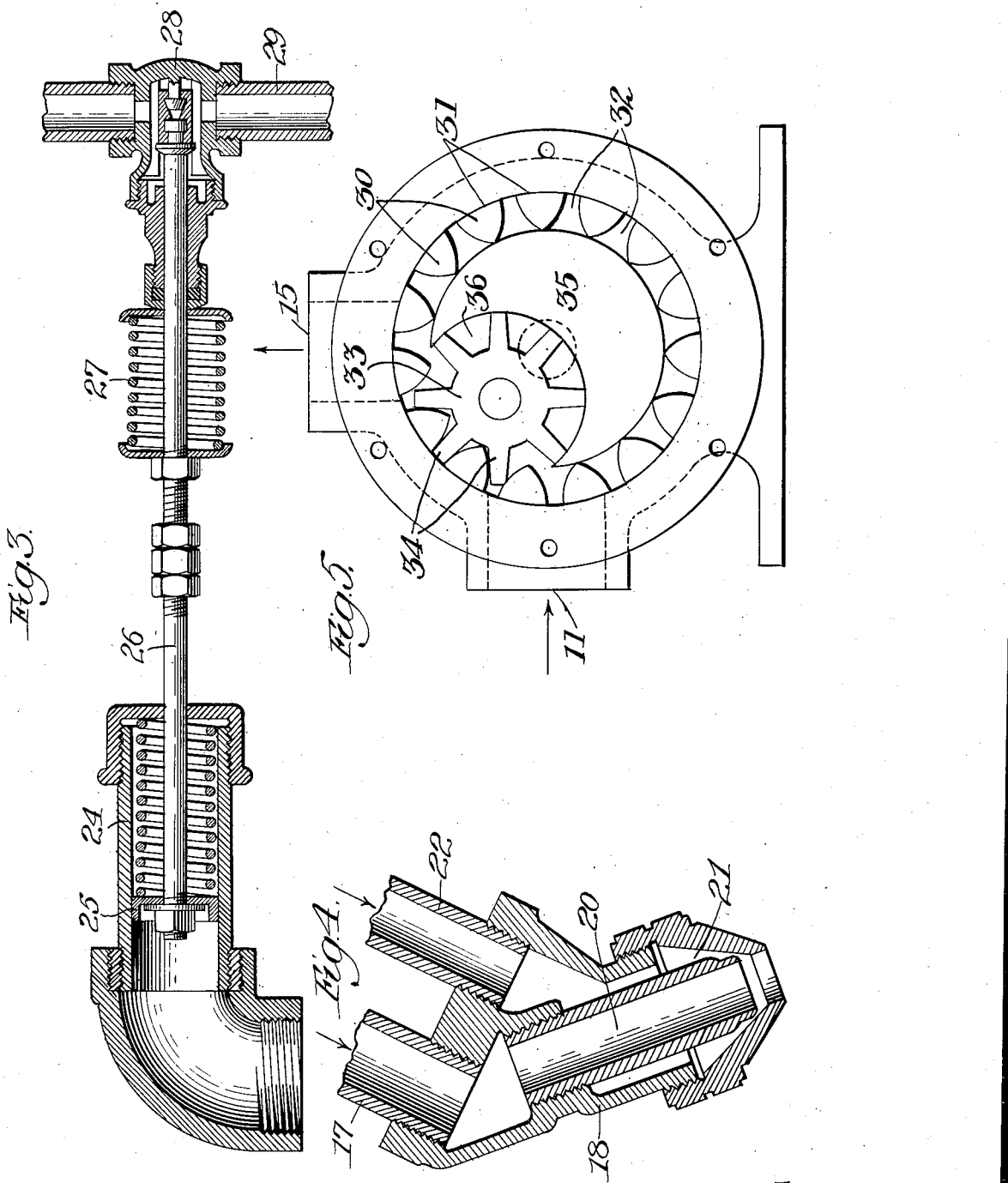

2,201,736

UNITED STATES PATENT OFFICE 2,201,736

APPARATUS FOR APPLYING A PLASTIC INSULATING COMPOSITION

Orville V. McGrew, Chicago, Ill.

Original application December 10, 1936, Serial No. 115,254. Divided and this application May 24, 1937, Serial No. 144,559

1 Claim. (Cl. 91—45)

This invention is an apparatus for applying a plastic insulating composition of the type herein described. It is fully described in the accompanying specification and the apparatus is illustrated in the accompanying drawings in which—

Fig. 1 is a side elevation; Fig. 2 is a view of part of the apparatus looking from the left of Fig. 1; Fig. 3 is a horizontal section through the control apparatus; Fig. 4 is a section through the spray nozzle; and Fig. 5 is a diagrammatic view of the pump.

The plastic composition is composed very largely of granulated cork bonded with cut back asphalt mixed with a fine filler. The exact composition of a preferred compound will first be set forth, after which the general functions and necessities will be described. In practice I first make up what I term a glue base consisting of 45% Mid-Continent asphalt, 14% gilsonite, melting point 275-280° F. and 41% V. M. & P. (varnish makers and painters' naphtha).

The Mid-Continent asphalt is made from what is called Mid-Continent flux oil having an A. P. I. gravity at 60° F. of 8.5, flash 630° F., Engler viscosity at 210°, 130, Engler viscosity at 300°, 11.0, Engler viscosity at 350° F., 4.9. The flux oil has a melting point of 93° F. and an asphalt content of 41.9%.

The foregoing figures are for identification only and can naturally be varied considerably.

This selected flux oil is blown to a maximum temperature of 550° F. for approximately two hours. The gilsonite is then added and blowing continued at approximately the same temperature until a melting point of 200 and a penetration of 14 are obtained. The asphalt is then cooled to 300° and the naphtha is added. The naphtha will be varied to produce a viscosity of approximately 60 for winter temperatures and 100 for summer temperatures.

In making up the insulating composition I mix 230 gallons of the abovedescribed glue base, 100 gallons V. M. & P. naphtha, 204 lbs. of 10-20 mesh cork, 50 lbs. of pulverized cork, 130 lbs. 7 K asbestos fibre, 200 lbs. 7 M asbestos fibre, and 85 gallons of water containing 1½ lbs. chromic acid in solution.

The mixture thus formed is a plastic mass which can be applied by spraying in the apparatus illustrated. It adheres with sufficient tenacity either to vertical walls or to downwardly facing horizontal surfaces like ceilings to be self-sustaining, without slippage, or falling off when applied in layers as much as an inch thick when applied by spraying. In the spraying operation some of the naphtha is naturally evaporated so that the composition becomes somewhat stiffened in the applying operation.

In spraying the composition it is placed in a tank 10 (Fig. 1) from which it passes through a pipe 11 controlled by a valve 12 near the bottom through which it passes to a rotary pump 13 of the type shown diagrammatically in Fig. 5. A pump which is found to be satisfactory is one now marketed and known as the Viking Rotary Pump. The particular pump used has a rated capacity of 20 gallons per minute at 1200 R. P. M. In use the pump is operated at 60 R. P. M. which delivers 1 gallon of the composition per minute. The pump may be driven in any convenient manner, but since compressed air must be available in any event for spraying, it is preferred to operate it by an air motor 14. The pump 13 delivers the composition through a pipe 15 from which it finds its way through a fitting 16 to a hose 17. At the end of the hose 17 is a spray nozzle 18 controlled by a valve 19. In this nozzle the composition is carried through a central pipe 20 and compressed air is released around the emergent stream of the composition through an annular opening 21, the air being supplied by the compressed air line 22 controlled by a valve 23.

In order to prevent excess pressure in the hose the control mechanism shown in Fig. 3 is employed. The fitting 16 communicates with a cylinder 24 in which is a spring pressed piston 25. Upon the occurrence of excess pressure in the cylinder 24 the piston moves out, pushing the rod 26 against a spring 27, closing a valve 28 in line 29 supplying air to the air motor.

The pump preferred is shown in Fig. 5. The charge enters at 11 and is discharged from 15. Inside of the pump is a rotor 30 which is provided with a number of teeth 31 separated by openings 32. An idler 33 is rotatably mounted within the pump and is provided with teeth 34 which fit snugly the openings 32. A baffle 35 is provided in the pump with a segment 36 cut therefrom to accommodate the idler teeth. In operation, the rotor turns in a counter-clockwise direction with the result that the idler teeth are withdrawn from the openings 32 as these openings pass the inlet 11. This creates a suction which draws in a limited amount of material to the openings thus created. This material is then squeezed out near the discharge 15 by the re-engagement of the teeth 31 of the rotor with the slots in the idler and the re-engagement of the idler teeth with the openings in the rotor.

The apparatus described has been found entirely satisfactory for the application of the composition which it sprays at the above mentioned rate of a gallon a minute, with sufficient force to adhere easily to the surfaces against which the spray is directed. It is found in practice that the mass after application is quite well filled with voids which provide insulating dead air spaces. These voids apparently arise in part from air entrapped in the spraying operation and in part from the spaces left on the evaporation of the naphtha. The composition before application is quite free from voids.

The development of the present apparatus and process has disclosed some interesting qualities of the composition which considerably restrict the methods in which the composition can be handled. The bulk of the composition is obviously the granulated cork. The remainder of the composition, on superficial examination at least, seems only approximately to fill the voids and to supply a rather thin coating on the cork granules. The cork granules themselves are, of course, very readily compressible. After the development of the composition efforts were made to apply it with a conventional spray apparatus in which the composition was to be forced to the spray nozzle by pressure applied on the tank. Two unexpected difficulties immediately presented themselves. First, the mass tended to compress and squeeze out the somewhat fluid asphalt as water is squeezed out of a sponge, so that such material as did reach the nozzle was very irregular. Second, the compression of the mass by the driving pressure over it produced a very stiff rigid cork body which it was very difficult to drive through a pipe which in many cases would not move at all. These difficulties were overcome by employing the pump illustrated which sucks in the composition in small masses and exerts pressure under conditions where series separation does not occur and where any compression of cork does not interfere appreciably with its transmission to the nozzle. Furthermore, if there be any change within the hose the composition is in a narrow stream where separation of the ingredients cannot produce large scale effects such as occur in a tank. Thus when the composition arrives at the nozzle and pressure is released it is practically in the same condition as when it left the tank.

It is, however, evident that if suction is to be relied upon to draw the composition to the pump, the composition itself must be sufficiently free from voids that no channels shall be left through the mass in the tank which would break the suction.

By the use of the present composition method and apparatus it is possible to apply quite thick layers of composition at very high speed. The composition adheres readily in any thickness likely to be used and when dried out by the evaporation of the bulk of the naphtha is quite rigid. The asphalt, however, is of the type which while having a very low temperature susceptibility is somewhat yielding or rubbery at all temperatures. The compound after application, therefore, possesses all the flexibility required to prevent it from chipping and breaking even when a metal surface to which it is applied is very seriously distorted.

The body provided by the application is not only an excellent heat insulator but is quite an effective sound deadener, and when applied to metal walls as in the case of the interior of automobile bodies, it is thoroughly effective in preventing the vibrations which, in many cases, are so objectionable. The application thus provided is peculiarly desirable in the case of automobile bodies because the coating can be used in thicknesses much greater than is feasible with the more common asphaltic compositions so the body hum or vibration can be reduced with exceptional efficiency. In the actual use of the composition it is generally applied in layers about half inch thick, and with material supplied at the rate of a gallon per minute the coating can be applied in this thickness at the rate of about three cubic fee a minute.

This application is a division of my copending application Serial No. 115, 254, filed December 10, 1936.

What I claim as new and desire to secure by Letters Patent, is:

Apparatus of the class described comprising a supply tank to receive a semi-fluid insulating composition, a rotary pump mechanism located immediately adjacent the bottom of the tank and taking suction from the bottom of the tank, the pump being adapted to remove the semi-fluid composition in successive small increments, a hose connected to the pump, said pump being adapted to propel the composition under high pressure through the hose, a spray nozzle at the end of the hose, and a compressed air connection on the spray nozzle.

ORVILLE V. McGREW.